US011363080B1

United States Patent
Iyer et al.

(10) Patent No.: US 11,363,080 B1
(45) Date of Patent: Jun. 14, 2022

(54) MANAGED INTELLIGENT DISCOVERY AND MESH CONNECTIVITY ORCHESTRATION FOR COLLABORATION SOLUTIONS

(71) Applicant: Dell Products L.P., Hopkinton, MA (US)

(72) Inventors: Vivek Viswanathan Iyer, Austin, TX (US); Loo Shing Tan, Singapore (SG)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/154,329

(22) Filed: Jan. 21, 2021

(51) Int. Cl.
*H04L 65/401* (2022.01)
*H04L 65/403* (2022.01)
*H04L 9/40* (2022.01)

(52) U.S. Cl.
CPC ........ *H04L 65/403* (2013.01); *H04L 65/4015* (2013.01); *H04L 63/20* (2013.01)

(58) Field of Classification Search
CPC ... H04L 65/403; H04L 63/20; H04L 65/4015; H04L 41/0806; H04L 67/10; H04L 12/1813
USPC .......................................................... 709/204
See application file for complete search history.

(56) References Cited

U.S. PATENT DOCUMENTS

| 2006/0253455 | A1* | 11/2006 | Potra | G06F 16/93 |
| 2008/0091777 | A1* | 4/2008 | Carlos | G06Q 10/10 709/204 |
| 2008/0320081 | A1* | 12/2008 | Shriver-Blake | G06Q 10/10 709/205 |
| 2012/0216244 | A1* | 8/2012 | Kumar | G06F 21/57 726/1 |
| 2013/0111355 | A1* | 5/2013 | Jennings | H04N 21/4788 715/753 |
| 2015/0271013 | A1* | 9/2015 | Singh | H04L 12/1813 709/223 |
| 2017/0187576 | A1* | 6/2017 | Singh | G06Q 10/101 |
| 2021/0092012 | A1* | 3/2021 | Singh | H04L 67/10 |

* cited by examiner

*Primary Examiner* — Glenford J Madamba
(74) *Attorney, Agent, or Firm* — Chamberlain, Hrdlicka, White, Williams & Aughtry (57) ABSTRACT

A method for managing intelligent discovery and mesh connectivity orchestration for collaboration solution sessions. The disclosed method may be information technology decision maker (ITDM) and security compliant while offering a simplified end-user experience to overcome pain points tied to co-located collaboration user experience. The disclosed method may provide time and/or session bound manageability (and security) policies tied to co-located collaboration actions (e.g., hotkey based) and connectivity management. The disclosed method may further offer peer-to-peer (P2P) session management optimization using out-of-band (OOB) capabilities and negotiations for purposes of screen casting, content sharing, etc. The disclosed method moreover initializes mesh connectivity state contingent for P2P sessions, as well as adapts mesh state to real-time changes in participant system and/or connectivity states.

18 Claims, 7 Drawing Sheets

MANAGED INTELLIGENT DISCOVERY AND MESH CONNECTIVITY ORCHESTRATION FOR COLLABORATION SOLUTIONS

BACKGROUND

For any given collaboration session amongst devices (and the users thereof), there exists a session initiator and at least one session peer. Collectively, these entities work to distribute collaboration session tasks, workloads, resources, and other responsibilities.

SUMMARY

In general, in one aspect, the invention relates to a method for collaboration session management. The method includes performing, by a session initiator and until a collaboration session terminates, an iterative process that includes collecting local context, transmitting the local context to a collaboration platform service, receiving, from the collaboration platform service, a just-in-time configuration policy selected at least based on the local context, and adjusting, based on the just-in-time configuration policy, at least a management of the collaboration session contributed by the session initiator.

In general, in one aspect, the invention relates to a non-transitory computer readable medium (CRM). The non-transitory CRM includes computer readable program code, which when executed by a computer processor, enables the computer processor to perform a method for collaboration session management. The method includes performing, by a session initiator and until a collaboration session terminates, an iterative process that includes collecting local context, transmitting the local context to a collaboration platform service, receiving, from the collaboration platform service, a just-in-time configuration policy selected at least based on the local context, and adjusting, based on the just-in-time configuration policy, at least a management of the collaboration session contributed by the session initiator.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method for managing intelligent discovery and mesh connectivity orchestration for collaboration solution sessions. The disclosed method may be information technology decision maker (ITDM) and security compliant while offering a simplified end-user experience to overcome pain points tied to co-located collaboration user experience. The disclosed method may provide time and/or session bound manageability (and security) policies tied to co-located collaboration actions (e.g., hotkey based) and connectivity management. The disclosed method may further offer peer-to-peer (P2P) session management optimization using out-of-band (OOB) capabilities and negotiations for purposes of screen casting, content sharing, etc. The disclosed method moreover initializes mesh connectivity state contingent for P2P sessions, as well as adapts mesh state to real-time changes in participant system and/or connectivity states.

Figure 1:
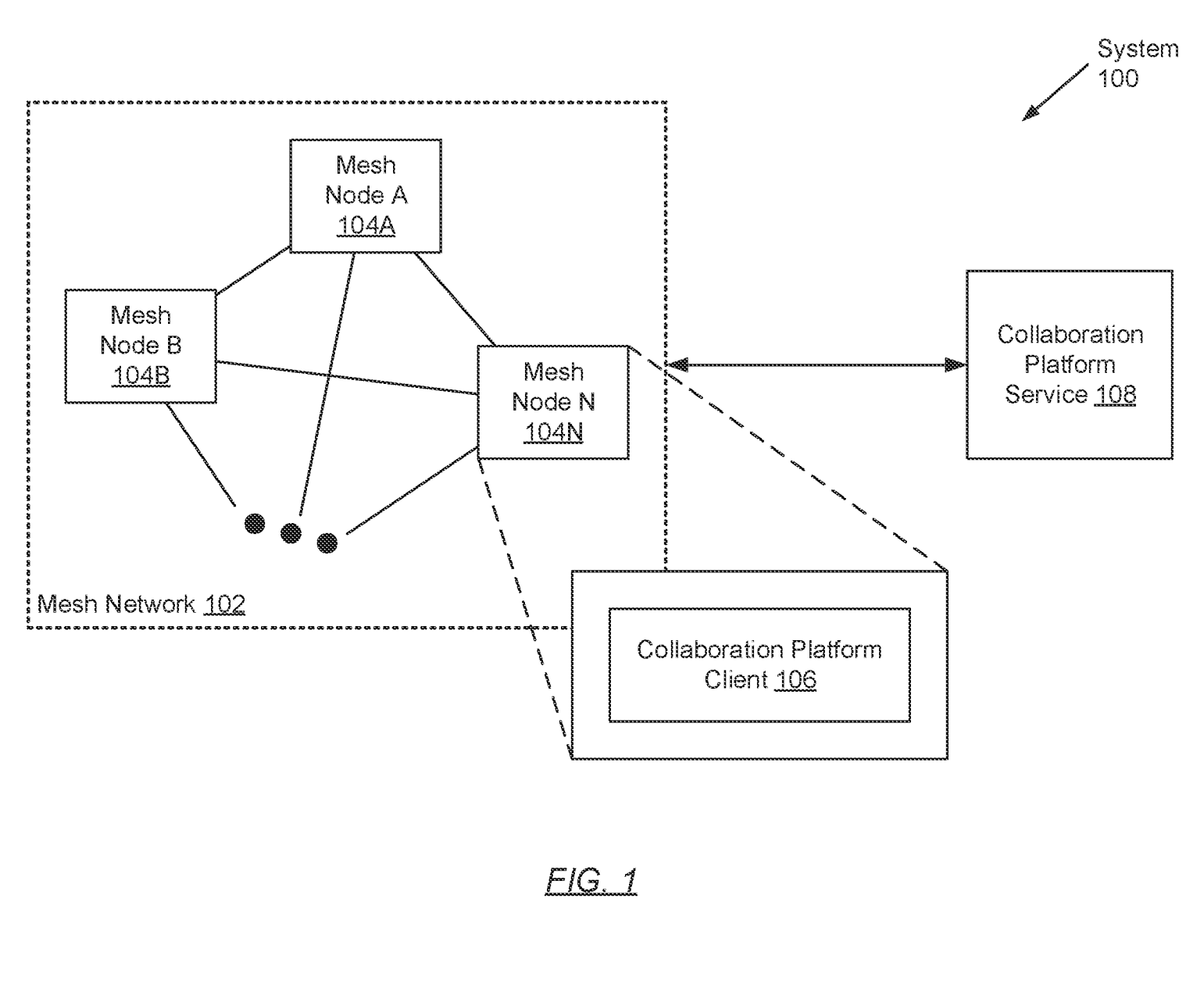
FIG. 1 shows a system in accordance with one or more embodiments of the invention.

FIG. 1 shows a system in accordance with one or more embodiments of the invention. The system (100) may include two or more mesh nodes (104A-104N) operatively connected to a collaboration platform service (108). Each of these system (100) components is described below.

In one embodiment of the invention, a mesh node (104A-104N) may represent any physical appliance or computing system configured to receive, generate, process, and/or transmit data, as well as to provide an environment in which at least a collaboration platform client (106) (described below) may operate thereon. In providing the aforementioned environment, a mesh node (104A-104N) may include and allocate various resources (e.g., computer processors, memory, storage, virtualization, networking, etc.), as needed, for at least the collaboration platform client (106) thereon to consume. One of ordinary skill will appreciate that a mesh node (104A-104N) may support other software and/or firmware, and may perform other functionalities without departing from the scope of the invention. Examples of a mesh node (104A-104N) may include, but are not limited to, a desktop computer, a laptop computer, a tablet computer, a smartphone, an intelligent or interactive display, a smart television, or any other computing system similar to the exemplary computing system shown in FIG. 7.

In one embodiment of the invention, each mesh node (104A-104N) may connect directly or indirectly (i.e., via a switch, a router, or any other network device (not shown)) to every other mesh node (104A-104N), thereby forming a mesh network (102). The mesh network (102) may therefore refer to a dynamic and non-hierarchical (or decentralized) network topology, where the mesh nodes (104A-104N) may include functionality to self-organize and self-configure. In this mesh network (102) formation, tasks and/or workloads may be distributed across the constituent mesh nodes (104A-104N).

In one embodiment of the invention, a collaboration platform client (106) may refer to software, firmware, or a combination thereof, which enables features and functionalities of a collaboration platform to execute or operate on the underlying hardware of any mesh node (104A-104N). The aforementioned collaboration platform may entail any service or tool (also referred to as groupware) that facilitates team or group collaboration—examples of which may include, but are not limited to, voice over Internet Protocol (VoIP) services, video-conferencing services, document sharing services, messaging services, email services, group calendar services, or any combination thereof. Further, each collaboration platform client (106) (respectively on each mesh node (104A-104N)) may include functionality to communicate, and thus exercise peer-to-peer (P2P) networking, with every other collaboration platform client (106) (respectively on every other mesh node (104A-104N)). Moreover, any collaboration platform client (106) may include additional functionality to communicate, or otherwise interact, with the collaboration platform service (108). One of ordinary skill will appreciate that any collaboration platform client (106) may perform other functionalities without departing from the scope of the invention.

In one embodiment of the invention, for any given collaboration session, one of the collaboration platform clients (106) (or one of the mesh nodes (104A-104N)) may take on the role of the session initiator, whereas the remaining collaboration platform clients (106) (or the remaining mesh nodes (104A-104N)) may each take on the role of a session peer. The session initiator may refer to the entity responsible for creating, hosting, or initializing the given collaboration session and, accordingly, may at least perform the methods outlined in FIGS. 2 and 5, below, which are directed to managed intelligent discovery and mesh connectivity orchestration, respectively. Further, the session initiator may embody (or operate on) a private device—i.e., a physical computing device (e.g., desktop computer, laptop computer, tablet computer, smartphone, etc.) belonging to and operated by an individual user. On the other hand, a session peer may refer to an entity selected or invited, by the session initiator, to join and participate in the given collaboration session. To that extent, each session peer may at least perform the methods outlined in FIGS. 3 and 6, below, which are directed to managed intelligent discovery and mesh connectivity orchestration, respectively. A session peer may embody (or operate on) another private device (described above) or may alternatively embody (or operate on) a public device—i.e., a physical computing device (e.g., intelligent/interactive display, smart television, etc.) available for community use. One of ordinary skill will appreciate that the session initiator and each session peer may perform other functionalities without departing from the scope of the invention.

In one embodiment of the invention, the collaboration platform service (108) may represent information technology (IT) infrastructure configured for collaboration platform back-end support. To that extent, the collaboration platform service (108) may include functionality to at least perform the method outlined in FIG. 4, below, which is directed to managed intelligent discovery. One of ordinary, however, will appreciate that the collaboration platform service (108) may perform other functionalities without departing from the scope of the invention. Furthermore, the collaboration platform service (108) may be implemented using one or more servers (not shown). Each server may represent a physical or virtual server, which may reside in a data center or cloud computing environment. Additionally, or alternatively, the collaboration platform service (108) may be implemented using one or more computing systems similar to the exemplary computing system shown in FIG. 7.

In one embodiment of the invention, the above-mentioned system (100) components may communicate with one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

While FIG. 1 shows a configuration of components, other system (100) configurations may be used without departing from the scope of the invention.

Figure 2:
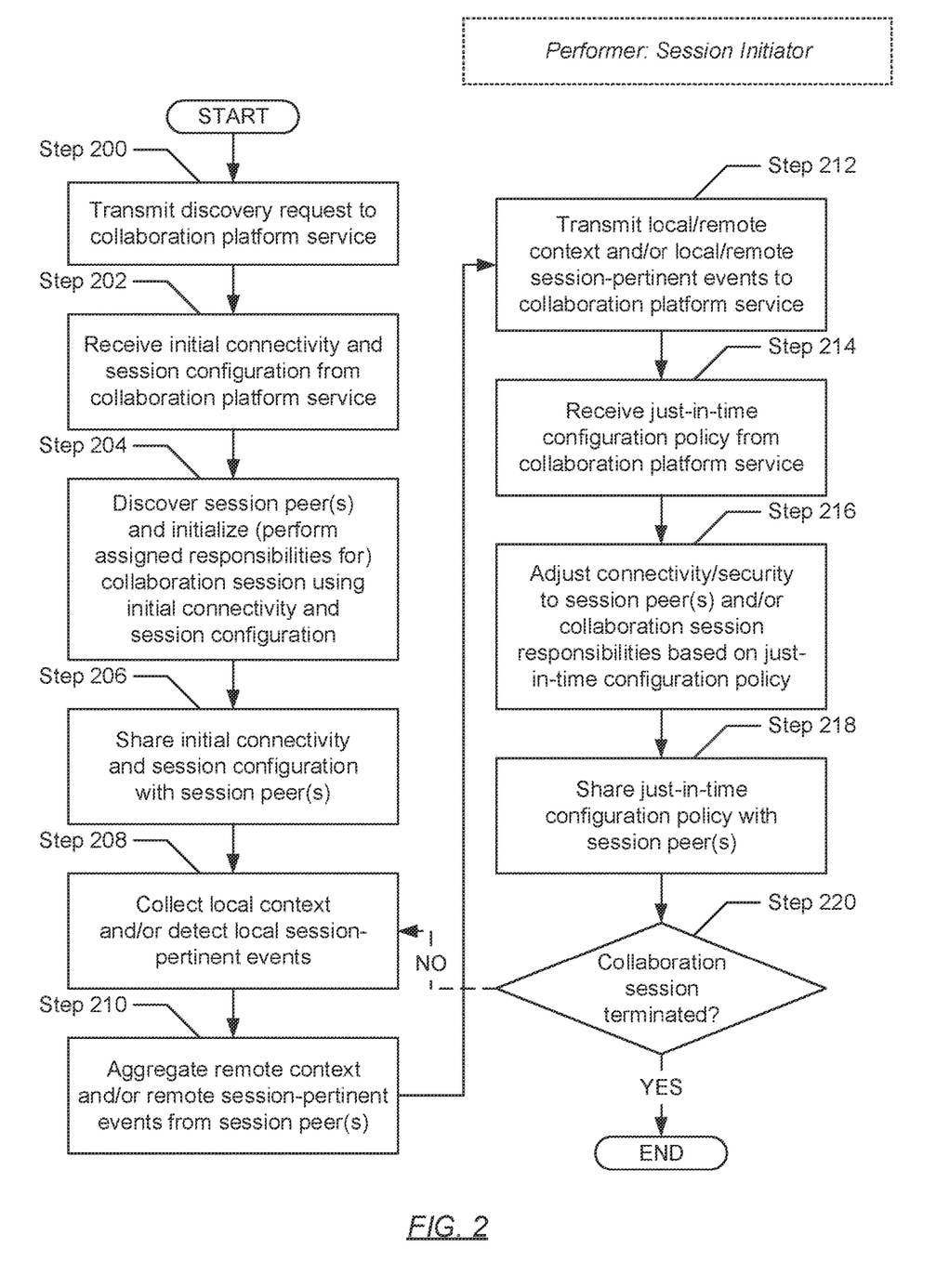
FIG. 2 shows a flowchart describing a method for managed intelligent discovery in accordance with one or more embodiments of the invention.

FIG. 2 shows a flowchart describing a method for managed intelligent discovery in accordance with one or more embodiments of the invention. The various steps outlined below may be performed by a session initiator (described above) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a discovery request is transmitted to the collaboration platform service (see e.g., FIG. 1). In one embodiment of the invention, the discovery request may be submitted to seek instructions pertinent to the intelligent discovery of one or more session peers, as well as to the initialization and management of a collaboration session entailing the session initiator and the aforementioned session peer(s).

In Step 202, in response to the discovery request (transmitted in Step 200), an initial connectivity and session configuration is received from the collaboration platform service. In one embodiment of the invention, the initial connectivity and session configuration may include initial parameters (or values thereof) pertinent to session peer discovery, connectivity, and security. Further, the initial connectivity and session configuration may also include initial parameters (or values thereof) pertinent to collaboration session management.

In Step 204, one or more session peers is/are discovered using at least a portion of the initial connectivity and session configuration (received in Step 202). Specifically, in one embodiment of the invention, any received initial parameters (or values thereof) pertinent to session peer discovery (e.g., wireless channels used for co-located device discovery) may be employed to detect and identify any co-located private and/or public session peer(s). Following their discovery, at least another portion of the initial connectivity and session configuration—i.e., any received initial parameters (or values thereof) pertinent to session peer connectivity and security (e.g., wireless network whitelist, data encryption, Wi-Fi/wireless security protocol, etc.)—may be utilized to establish, secure, and maintain a connection to one or more discovered session peers. Thereafter, at least yet another portion of the initial connectivity and session configuration—i.e., any received initial parameters (or values thereof) pertinent to collaboration session management (e.g., data resolution and sharing bitrate, audio-video (AV) settings, P2P networking, etc.)—may be used to initialize and maintain the collaboration session or instance.

In Step 206, the initial connectivity and session configuration (or at least a portion thereof) (received in Step 202) is shared with one or more session peers (discovered in Step 204). In one embodiment of the invention, the session peer(s) may subsequently use the shared information to, for example: discover one or more other session peers (if any); establish, secure, and maintain connection(s) with the session initiator and other session peer(s) (if any); contribute towards the management of the collaboration session; and perform any other assigned collaboration session responsibilities.

In Step 208, local context is collected. In one embodiment of the invention, local context may encompass any contextual information relevant to the session initiator, which may be predefined, sensed, measured, inferred, or otherwise obtained. By way of examples, local context may include, but is not limited to, local user contextual information (e.g., user presence/absence, user preferences, user location, etc.), local device contextual information (e.g., device class, device resources, real-time device state, etc.), local application contextual information (e.g., process(es)/application(s) executing in foreground, process(es)/application(s) executing in background, etc.), and local operating system (OS) contextual information (e.g., OS distribution, OS version, OS user interface (UI) brightness, etc.). Further, in addition to collecting local context, one or more local session-pertinent events may be detected. A local session-pertinent event may refer to any action (or function) performed (or triggered) by the user of the session initiator—e.g., long-press hotkey invocation—during a runtime of the collaboration session.

In Step 210, remote context is aggregated. In one embodiment of the invention, remote context may encompass any contextual information relevant to one or more session peers, which may be predefined, sensed, measured, inferred, or otherwise obtained (via the session peer(s)). By way of examples, for any given session peer, remote context may include, but is not limited to, remote user contextual information (e.g., user presence/absence, user preferences, user location, etc.), remote device contextual information (e.g., device class, device resources, real-time device state, etc.), remote application contextual information (e.g., process(es)/application(s) executing in foreground, process(es)/application(s) executing in background, etc.), and remote operating system (OS) contextual information (e.g., OS distribution, OS version, OS user interface (UI) brightness, etc.). Further, in addition to the remote context, remote session-pertinent events, submitted by the session peer(s), may also be aggregated. A remote session-pertinent event may refer to any action (or function) performed (or triggered) by the user of a session peer—e.g., long-press hotkey invocation—during a runtime of the collaboration session.

In Step 212, the local context and/or local session-pertinent event(s) (collected/detected in Step 208) is transmitted to the collaboration platform service. Further, if any were submitted, the remote context and/or remote session-pertinent event(s) (aggregated from the session peer(s) in Step 210) may also be transmitted to the collaboration platform service.

In Step 214, a just-in-time configuration policy is subsequently received from the collaboration platform service. In one embodiment of the invention, the just-in-time configuration policy may outline, and provide instructions (or updated parameters) for implementing, information technology (IT) compliant changes to: the existing runtime configuration of the collaboration session; the management thereof contributed by the session initiator and/or one or more session peers; and/or any other connectivity and security considerations. Further, the just-in-time configuration policy may have been selected or identified, by the collaboration platform service, using or based on the local context, local session-pertinent event(s), remote context, remote session-pertinent event(s), or any combination thereof (transmitted thereto in Step 212).

In Step 216, based on the just-in-time configuration policy (received in Step 214), connectivity and/or security considerations, entailing the session initiator and/or one or more session peers, are adjusted. For example, submitted local context may inform the collaboration platform service that the session initiator is currently using a virtual private network (VPN) while on an insecure wireless wide area network (WWAN) (i.e., a mobile communications network). In response to the submitted local context, a received just-in-time configuration policy may instruct the session initiator to disable or cease using the WWAN and, subsequently, join a specified whitelisted network using a more secure wireless local area network (WLAN) or Wi-Fi technology. Additionally, or alternatively, based on the just-in-time configuration policy (received in Step 214), the contributed management of the collaboration session, by the session initiator and/or the session peer(s), or any other collaboration session responsibilities thereof, may be adjusted. For example, a submitted remote session-pertinent event (e.g., a long press of a hotkey by a session peer user) may inform the collaboration platform service that the session peer user wishes to project their screen to a co-located intelligent display. In response to the submitted remote session-pertinent event, and via the session initiator, a received just-in-time configuration policy may thus instruct the session peer, associated with the session peer user, to trigger discovery, identify and connect with the co-located intelligent display, and initiate screen casting using peer-to-peer (P2P) networking.

In Step 218, the just-in-time configuration policy (or at least a portion thereof) (received in Step 214) is shared with the session peer(s) (discovered in Step 204). That is, in one embodiment of the invention, sharing of the just-in-time configuration policy (or at least a portion thereof) may transpire should the just-in-time configuration policy (or at least a portion thereof) impact any subset or all of the session peers (see e.g., the above-mentioned second example entailing the submitted remote session-pertinent event).

In Step 220, a determination is made as to whether the collaboration session has been terminated. In one embodiment of the invention, if it is determined that the collaboration session has been terminated, then the process ends. On the other hand, in another embodiment of the invention, if it is alternatively determined that the collaboration session is not yet terminated, then the process proceeds to Step 208, where a next iteration of local context may be collected and/or local session-pertinent events may be detected.

While session peer discovery is shown in FIG. 2 and described above as a one-time (non-iterative) process, one of ordinary skill will appreciate that session peer discovery may occur periodically throughout the runtime of a collaboration session, thereby enabling the detection and capturing of dynamic, real-time events (e.g., user and/or device joining or exiting, etc.).

Figure 3:
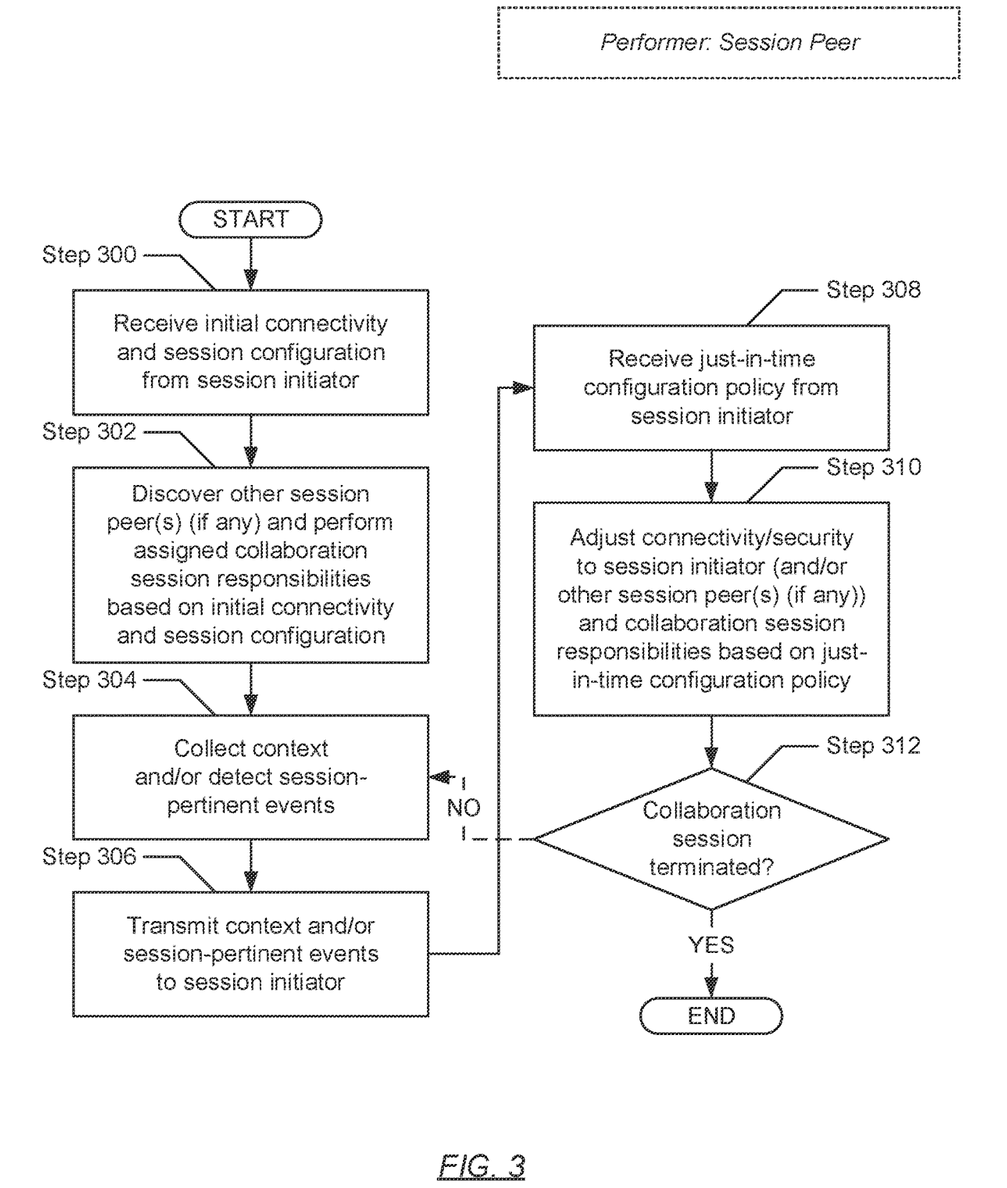
FIG. 3 shows a flowchart describing a method for managed intelligent discovery in accordance with one or more embodiments of the invention.

FIG. 3 shows a flowchart describing a method for managed intelligent discovery in accordance with one or more embodiments of the invention. The various steps outlined below may be performed by any session peer (described above) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, an initial connectivity and session configuration (or at least a portion thereof) is received from a session initiator of a collaboration session. In one embodiment of the invention, the initial connectivity and session configuration may include initial parameters (or values thereof) pertinent to session peer discovery, connectivity, and security. Further, the initial connectivity and session configuration may also include initial parameters (or values thereof) pertinent to collaboration session management.

In Step 302, one or more other session peers (if any) is/are discovered using the initial connectivity and session configuration (or at least a portion thereof) (received in Step 300). Specifically, in one embodiment of the invention, any received initial parameters (or values thereof) pertinent to session peer discovery (e.g., wireless channels used for co-located device discovery) may be employed to detect and identify any co-located private and/or public session peer(s). Thereafter, the initial connectivity and session configuration (or at least a portion thereof)—i.e., any received initial parameters (or values thereof) pertinent to session peer connectivity and security (e.g., wireless network whitelist, data encryption, Wi-Fi/wireless security protocol, etc.)—may be utilized to establish, secure, and maintain a connection to the session initiator, as well as the one or more discovered session peers (if any). Moreover, the initial connectivity and session configuration (or at least a portion thereof)—i.e., any received initial parameters (or values thereof) pertinent to collaboration session management (e.g., data resolution and sharing bitrate, audio-video (AV) settings, P2P networking, etc.)—may be used in contributing towards the management of the collaboration session; and perform any other assigned collaboration session responsibilities.

In Step 304, context is collected. In one embodiment of the invention, the context may encompass any contextual information relevant to the session peer, which may be predefined, sensed, measured, inferred, or otherwise obtained (by the session peer). By way of examples, the context may include, but is not limited to, user contextual information (e.g., user presence/absence, user preferences, user location, etc.), device contextual information (e.g., device class, device resources, real-time device state, etc.), application contextual information (e.g., process(es)/application(s) executing in foreground, process(es)/application(s) executing in background, etc.), and operating system (OS) contextual information (e.g., OS distribution, OS version, OS user interface (UI) brightness, etc.). Further, in addition to collecting context, one or more session-pertinent events may be detected. A session-pertinent event may refer to any action (or function) performed (or triggered) by the user(s) (if any) of the session peer—e.g., long-press hotkey invocation—during a runtime of the collaboration session.

In Step 306, the context (collected in Step 304), and (if any) the session-pertinent event(s) (detected in Step 304), is/are transmitted to the session initiator. In Step 308, in response to the aforementioned transmission of information, a just-in-time configuration policy (or at least a portion thereof) is subsequently received from the session initiator. In one embodiment of the invention, the just-in-time configuration policy may outline, and provide instructions (or updated parameters) for implementing, information technology (IT) compliant changes to: the existing runtime configuration of the collaboration session; the management thereof contributed by the session initiator and/or one or more session peers; and/or any other connectivity and security considerations. Further, the just-in-time configuration policy may have been selected or identified, by a collaboration platform service (see e.g., FIG. 1), using or based at least on the context and/or session-pertinent events (transmitted in Step 306).

In Step 310, based on the just-in-time configuration policy (or at least a portion thereof) (received in Step 308), connectivity and/or security considerations, management of the collaboration session, and/or any other collaboration session responsibilities, impacting the session peer, is/are adjusted. For example, a submitted remote session-pertinent event (e.g., a long press of a hotkey by a session peer user) to the session initiator may inform the collaboration platform service that the session peer user wishes to project their screen to a co-located intelligent display. In response to the submitted remote session-pertinent event, and via the session initiator, a received just-in-time configuration policy may thus instruct the session peer to trigger discovery, identify and connect with the co-located intelligent display, and initiate screen casting using peer-to-peer (P2P) networking.

In Step 312, a determination is made as to whether the collaboration session has been terminated. In one embodiment of the invention, if it is determined that the collaboration session has been terminated, then the process ends. On the other hand, in another embodiment of the invention, if it is alternatively determined that the collaboration session is not yet terminated, then the process proceeds to Step 304, where a next iteration of context may be collected and/or session-pertinent events may be detected.

While session peer discovery is shown in FIG. 3 and described above as a one-time (non-iterative) process, one of ordinary skill will appreciate that session peer discovery may occur periodically throughout the runtime of a collaboration session, thereby enabling the detection and capturing of dynamic, real-time events (e.g., user and/or device joining or exiting, etc.).

Figure 4:
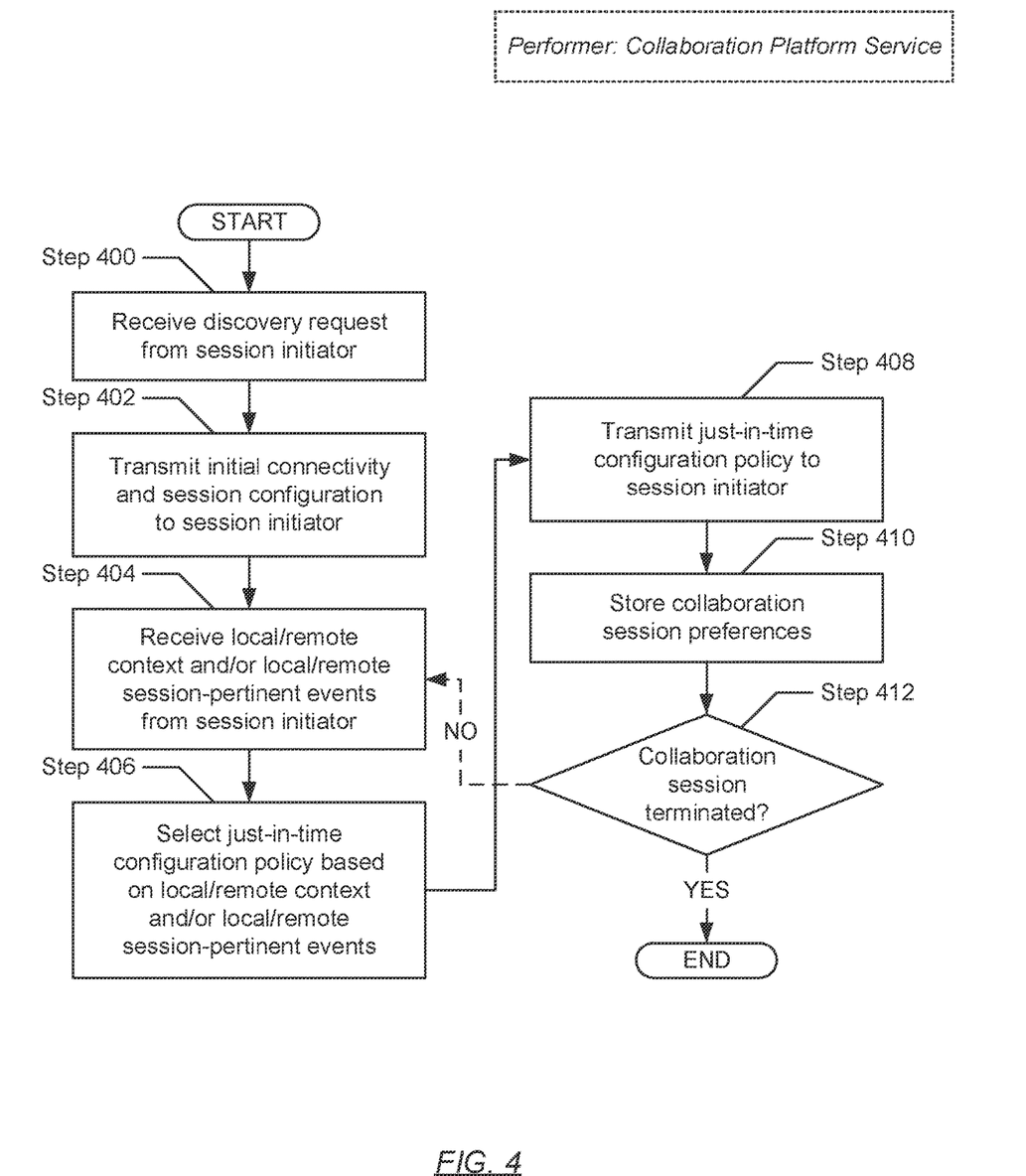
FIG. 4 shows a flowchart describing a method for managed intelligent discovery in accordance with one or more embodiments of the invention.

FIG. 4 shows a flowchart describing a method for managed intelligent discovery in accordance with one or more embodiments of the invention. The various steps outlined below may be performed by the collaboration platform service (described above) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a discovery request is received from a session initiator of a collaboration session. In one embodiment of the invention, the discovery request may be submitted to seek instructions pertinent to the intelligent discovery of one or more session peers, as well as to the initialization of the collaboration session entailing the session initiator and the aforementioned session peer(s).

In Step 402, in response to the discovery request (received in Step 400), an initial connectivity and session configuration is transmitted to the session initiator. In one embodiment of the invention, the initial connectivity and session configuration may include initial parameters (or values thereof) pertinent to session peer discovery, connectivity, and security. Further, the initial connectivity and session configuration may also include initial parameters (or values thereof) pertinent to collaboration session management and/or other collaboration session responsibilities.

In Step 404, local context, one or more local session-pertinent events, remote context, one or more remote session-pertinent events, or any combination thereof, is/are received from the session initiator. In one embodiment of the invention, local context may encompass any contextual information relevant to the session initiator, whereas remote context may alternatively encompass any contextual information relevant to a session peer. The contextual information may be predefined, sensed, measured, inferred, or otherwise obtained by the session initiator or session peer. Examples of context may include, but is not limited to, user contextual information (e.g., user presence/absence, user preferences, user location, etc.), device contextual information (e.g., device class, device resources, real-time device state, etc.), application contextual information (e.g., process(es)/application(s) executing in foreground, process(es)/application(s) executing in background, etc.), and operating system (OS) contextual information (e.g., OS distribution, OS version, OS user interface (UI) brightness, etc.). Meanwhile, a local session-pertinent event may refer to any action (or function) performed (or triggered) by the user of the session initiator, whereas a remote session-pertinent event may refer to any action (or function) performed (or triggered) by the user of a session peer.

In Step 406, using or based on the local context, the local session-pertinent event(s), the remote context, the remote session-pertinent event(s), or any combination thereof (received in Step 404), a just-in-time configuration policy is selected. In one embodiment of the invention, the just-in-time configuration policy may outline, and provide instructions (or updated parameters) for implementing, information technology (IT) compliant changes to: the existing runtime configuration of the collaboration session; the management thereof contributed by the session initiator and/or one or more session peers; and/or any other connectivity and security considerations. Furthermore, in one embodiment of the invention, selection of the just-in-time configuration policy may entail a key-value lookup process, where a resulting value (i.e., just-in-time configuration policy) may be identified using a respective key (i.e., local context, local session-pertinent event(s), remote context, remote session-pertinent event(s), or any combination thereof). Alternatively, in another embodiment of the invention, selection of the just-in-time configuration policy may entail a machine learning (e.g., random forest based) classifier, which may provide an output (i.e., just-in-time configuration policy) based on a set of classifier inputs (i.e., local context, local session-pertinent event(s), remote context, remote session-pertinent event(s), or any combination thereof).

In Step 408, the just-in-time configuration policy (selected in Step 406), is transmitted to the session initiator. In one embodiment of the invention, should the just-in-time configuration policy (or at least a portion thereof) be directed to (or impact) the session initiator, the session initiator may then apply the changes outlined in the just-in-time configuration policy (or at least the portion thereof). Additionally, or alternatively, in another embodiment of the invention, should the just-in-time configuration policy (or at least a portion thereof) be directed to (or impact) one or more session peers, the session initiator may subsequently relay the changes outlined in the just-in-time configuration policy (or at least the portion thereof) to the appropriate session peer(s).

In Step 410, one or more collaboration session preferences is/are stored. In one embodiment of the invention, the collaboration session preference(s) may include, for example, user and/or system preferences (e.g., hotkey preferences, etc.) configured by the session initiator user and/or the session peer user(s) for the collaboration session.

In Step 412, a determination is made as to whether the collaboration session has been terminated. In one embodiment of the invention, if it is determined that the collaboration session has been terminated, then the process ends. On the other hand, in another embodiment of the invention, if it is alternatively determined that the collaboration session is not yet terminated, then the process proceeds to Step 404, where a next iteration of local context, local session-pertinent event(s), remote context, remote session-pertinent event(s), or any combination thereof, may be received from the session initiator.

Figure 5:
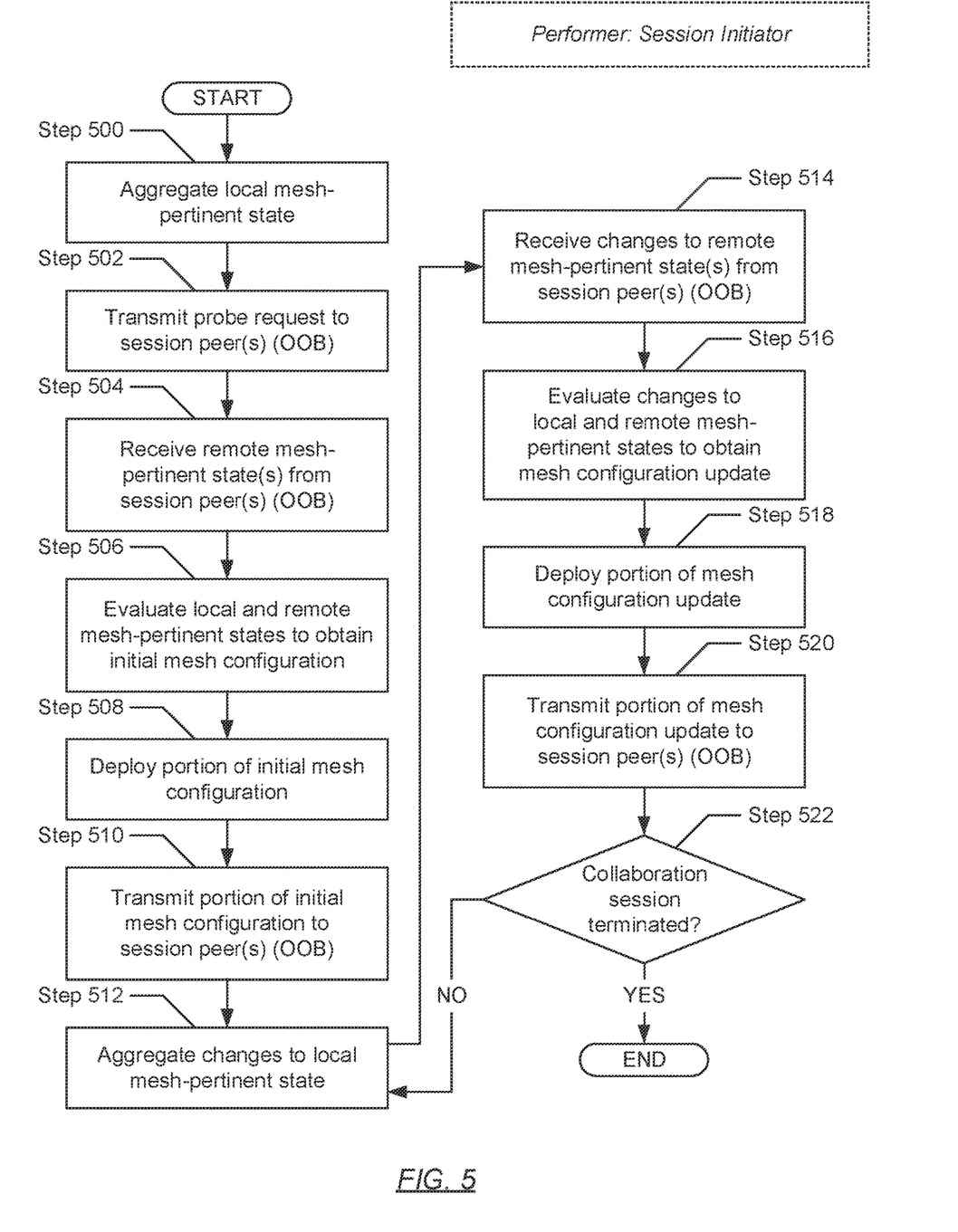
FIG. 5 shows a flowchart describing a method for managed mesh connectivity orchestration in accordance with one or more embodiments of the invention.

FIG. 5 shows a flowchart describing a method for managed mesh connectivity orchestration in accordance with one or more embodiments of the invention. The various steps outlined below may be performed by a session initiator (described above) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, local mesh-pertinent state is aggregated. In one embodiment of the invention, local mesh-pertinent state may refer to information describing the current condition, circumstances, and/or capabilities of the session initiator, which may influence the mesh network configuration and/or operations. Examples of local mesh-pertinent state may include, but are not limited to, current device resource (e.g., compute, storage, virtualization, networking, etc.) utilization metrics, current user status (e.g., present/available or exited/unavailable), current device capabilities (e.g., networking adaptor specs, sensor(s) specs, computer processor(s) specs, storage specs, etc.), and current device connectivity status (e.g., details on connection(s) to other mesh node(s) or other device(s) outside mesh network, collaboration session(s) parameters, etc.).

In Step 502, a probe request is transmitted to one or more session peers. In one embodiment of the invention, the probe request may be used to seek remote mesh-pertinent state from each of the session peer(s). Further, transmission of the probe request may employ out-of-band (OOB) or in-band communication channels.

In Step 504, in response to the probe request(s) (transmitted in Step 502), remote mesh-pertinent state is received from the session peer(s). In one embodiment of the invention, for any given session peer, the remote mesh-pertinent state may refer to information describing the current condition, circumstances, and/or capabilities of the given session peer, which may influence the mesh network configuration and/or operations. Examples of remote mesh-pertinent state may include, but are not limited to, current device resource (e.g., compute, storage, virtualization, networking, etc.) utilization metrics, current user status (e.g., present/available or exited/unavailable), current device capabilities (e.g., networking adaptor specs, sensor(s) specs, computer processor(s) specs, storage specs, etc.), and current device connectivity status (e.g., details on connection(s) to other mesh node(s) or other device(s) outside mesh network, collaboration session(s) parameters, etc.). Further, like the probe request(s), receipt of any remote mesh-pertinent state, from the session peer(s), may employ OOB or in-band communication channels.

In Step 506, the local mesh-pertinent state (aggregated in Step 500) and/or the remote mesh-pertinent state (received from the session peer(s) in Step 504) are evaluated, to obtain an initial mesh configuration. In one embodiment of the invention, the initial mesh configuration may outline an initial scheme through which collaboration session tasks, workloads, and/or other responsibilities may be distributed across the session initiator and the session peer(s). For example, given an exemplary collaboration session involving a session initiator and two session peers, and given some submitted local/remote mesh-pertinent state thereof, an initial mesh configuration may instruct: (a) the session initiator to wirelessly project their screen content to a co-located intelligent display using 720 progressive scan (p) resolution at 30 frames per second (fps) (or 720p30), as well as to project their screen content, via P2P networking, to the two session peers using 1080p30; (b) the first session peer to receive the screen content casted by the session initiator, as well as record and/or transcribe session notes onto a specified cloud documenting tool; and (c) the second session peer to just receive the screen content casted by the session initiator.

Furthermore, in one embodiment of the invention, the above-mentioned evaluation may entail any existing algorithm configured to determine role assignment, distributed task and/or workload allocation, P2P management, or a combination thereof. Moreover, in one embodiment of the invention, the evaluation may be performed by and/or on the session initiator. Alternatively, in another embodiment of the invention, performance of the evaluation may be delegated to the collaboration platform service (see e.g., FIG. 1).

In Step 508, at least a portion of the initial mesh configuration (obtained in Step 506)—relevant thereto—is deployed (or applied) by the session initiator. Subsequently, in Step 510, any portion(s) of the initial mesh configuration—relevant to one or more session peers—is transmitted to the session peer(s). In one embodiment of the invention, transmission of the initial mesh configuration portion(s) may employ OOB or in-band communication channels.

In Step 512, changes to local mesh-pertinent state (described above), associated with the session initiator, are aggregated. Similarly, in Step 514, changes to remote mesh-pertinent state (described above), associated with one or more session peers, are received therefrom. In one embodiment of the invention, receipt of the aforementioned changes to remote mesh-pertinent state may employ OOB or in-band communication channels.

In Step 516, the changes to local mesh-pertinent state (aggregated in Step 512) and/or the changes to remote mesh-pertinent state (received in Step 514) are evaluated, to obtain a mesh configuration update. In one embodiment of the invention, the mesh configuration update may outline adjustments to any existing scheme through which collaboration session tasks, workloads, and/or other responsibilities may be distributed across the session initiator and the session peer(s).

Furthermore, in one embodiment of the invention, the above-mentioned evaluation may entail any existing algorithm configured to determine adjustments to role assignment, distributed task and/or workload allocation, P2P management, or a combination thereof. Moreover, in one embodiment of the invention, the evaluation may be performed by and/or on the session initiator. Alternatively, in another embodiment of the invention, performance of the evaluation may be delegated to the collaboration platform service (see e.g., FIG. 1).

In Step 518, at least a portion of the mesh configuration update (obtained in Step 516)—relevant thereto—is deployed (or applied) by the session initiator. Subsequently, in Step 520, any portion(s) of the mesh configuration update—relevant to one or more session peers—is transmitted to the session peer(s). In one embodiment of the invention, transmission of the mesh configuration update portion(s) may employ OOB or in-band communication channels.

In Step 522, a determination is made as to whether the collaboration session has been terminated. In one embodiment of the invention, if it is determined that the collaboration session has been terminated, then the process ends. On the other hand, in another embodiment of the invention, if it is alternatively determined that the collaboration session is not yet terminated, then the process proceeds to Step 512, where a next iteration of changes to local mesh-pertinent state, associated with the session initiator, may be aggregated.

Figure 6:
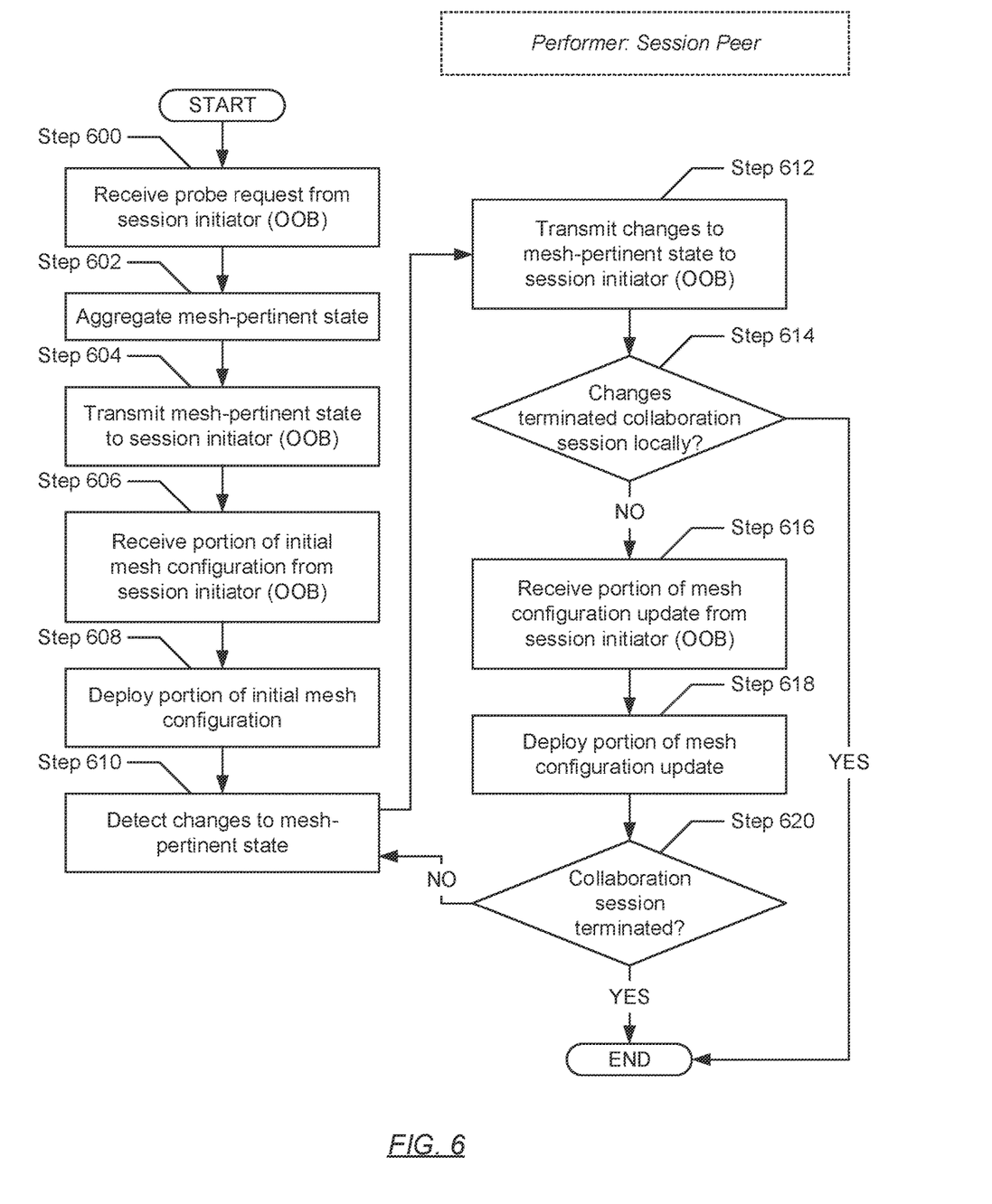
FIG. 6 shows a flowchart describing a method for managed mesh connectivity orchestration in accordance with one or more embodiments of the invention.

FIG. 6 shows a flowchart describing a method for managed mesh connectivity orchestration in accordance with one or more embodiments of the invention. The various steps outlined below may be performed by any session peer (described above) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 6, in Step 600, a probe request is received from a session initiator of a collaboration session. In one embodiment of the invention, the probe request may seek mesh-pertinent state from the session peer. Further, receipt of the probe request may employ out-of-band (OOB) or in-band communication channels.

In Step 602, in response to the probe request (received in Step 600), mesh-pertinent state, associated with the session peer, is aggregated. In one embodiment of the invention, the mesh-pertinent state may refer to information describing the current condition, circumstances, and/or capabilities of the session peer, which may influence the mesh network configuration and/or operations. Examples of mesh-pertinent state may include, but are not limited to, current device resource (e.g., compute, storage, virtualization, networking, etc.) utilization metrics, current user status (e.g., present/available or exited/unavailable), current device capabilities (e.g., networking adaptor specs, sensor(s) specs, computer processor(s) specs, storage specs, etc.), and current device connectivity status (e.g., details on connection(s) to other mesh node(s) or other device(s) outside mesh network, collaboration session(s) parameters, etc.).

In Step 604, the mesh-pertinent state (aggregated in Step 602) is transmitted to the session initiator. In one embodiment of the invention, transmission of the mesh-pertinent state may employ OOB or in-band communication channels. Thereafter, in Step 606, a portion of an initial mesh configuration—relevant to the session peer—is received from the session initiator. In one embodiment of the invention, the initial mesh configuration may outline an initial scheme through which collaboration session tasks, workloads, and/or other responsibilities may be distributed across the session initiator and the session peer(s). In Step 608, the initial mesh configuration portion (received in Step 606) is subsequently deployed (or applied) by the session peer.

In Step 610, one or more changes to the mesh-pertinent state (described above), associated with the session peer, is/are detected. In Step 612, the change(s) to the mesh-pertinent state (detected in Step 610) is/are transmitted to the session initiator. In one embodiment of the invention, the aforementioned transmission may employ OOB or in-band communication channels.

In Step 614, a determination is made as to whether the change(s) to the mesh-pertinent state (detected in Step 610) at least include (or lead to) a termination of the collaboration session locally—e.g., exiting of the session peer user from the collaboration session. In one embodiment of the invention, if it is determined that the change(s) do indeed include (or lead to) the termination of the collaboration session on or by the session peer, then the process ends. On the other hand, in another embodiment of the invention, if it is alternatively determined that the change(s) exclude (or will not lead to) the termination of the collaboration session locally, then the process proceeds to Step 616.

In Step 616, in response to the transmission of the change(s) to the mesh-pertinent state (in Step 612), at least a portion of a mesh configuration update—relevant thereto—is received from the session initiator. In one embodiment of the invention, the mesh configuration update may outline adjustments to any existing scheme through which collaboration session tasks, workloads, and/or other responsibilities may be distributed across the session initiator and the session peer(s). Further, receipt of the mesh configuration update portion may employ OOB or in-band communication channels. Thereafter, in Step 618, the mesh configuration update portion (received in Step 616) is subsequently deployed (or applied) by the session peer.

In Step 620, a determination is made as to whether the collaboration session has been terminated. In one embodiment of the invention, if it is determined that the collaboration session has been terminated, then the process ends. On the other hand, in another embodiment of the invention, if it is alternatively determined that the collaboration session is not yet terminated, then the process proceeds to Step 610, where a next iteration of changes to the mesh-pertinent state, associated with the session peer, may be detected.

Figure 7:
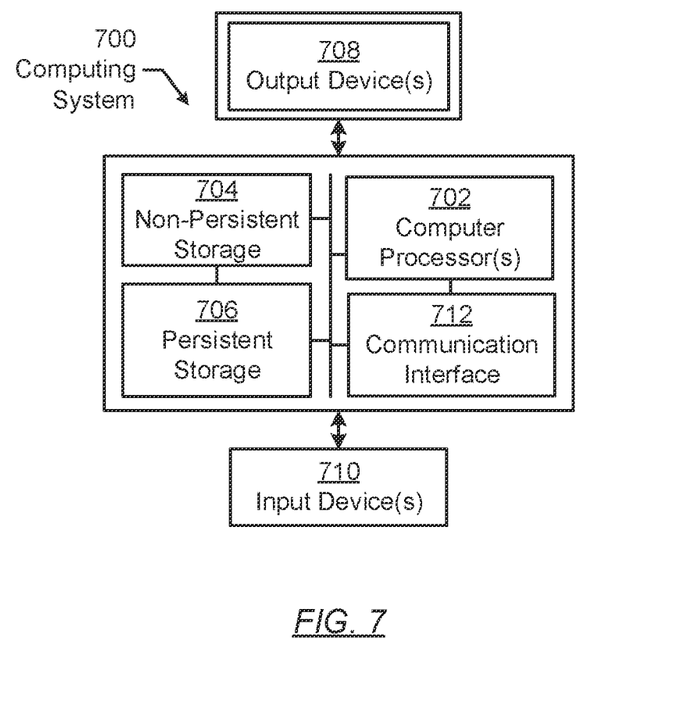
FIG. 7 shows an exemplary computing system in accordance with one or more embodiments of the invention.

FIG. 7 shows an exemplary computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a central processing unit (CPU) and/or a graphics processing unit (GPU). The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for collaboration session management, comprising:
  performing, by a session initiator and until a collaboration session terminates, an iterative process, comprising:
    collecting local context;
    transmitting the local context to a collaboration platform service;
    receiving, from the collaboration platform service, a just-in-time configuration policy selected at least based on the local context; and
    adjusting, based on the just-in-time configuration policy, at least a management of the collaboration session contributed by the session initiator,
  wherein the method further comprises:
    performing, by the session initiator and in parallel with the iterative process, a non-iterative process, comprising:
      aggregating local mesh-pertinent state;
      obtaining an initial mesh configuration based at least on the local mesh-pertinent state; and deploying at least a portion of the initial mesh configuration.

2. The method of claim 1, further comprising:
prior to transmitting the local context:
    detecting a local session-pertinent event triggered by a session initiator user associated with the session initiator,
wherein the local session-pertinent event is also transmitted to the collaboration platform service,
wherein the just-in-time configuration policy is selected further based on the local session-pertinent event.

3. The method of claim 1, further comprising:
prior to transmitting the local context:
    aggregating at least one selected from a group consisting of remote context and a remote session-pertinent event, from a session peer,
wherein the at least one selected from the group consisting of the remote context and the remote session-pertinent event, is also transmitted to the collaboration platform service,
wherein the just-in-time configuration policy is selected further based on the at least one selected from the group consisting of the remote context and the remote session-pertinent event.

4. The method of claim 3, further comprising:
after adjusting at least the management of the collaboration session contributed by the session initiator:
    sharing the just-in-time configuration policy with the session peer,
wherein the session peer, based on the just-in-time configuration policy, adjusts the management of the collaboration session contributed by the session peer.

5. The method of claim 1, wherein obtaining the initial mesh configuration comprises one selected from a group consisting of evaluating, by the session initiator, the local mesh-pertinent state and delegating, by the session initiator, an evaluation of the local mesh-pertinent state to the collaboration platform service.

6. The method of claim 1, further comprising:
prior to obtaining the initial mesh configuration:
    transmitting, using an out-of-band (OOB) communication channel, a probe request to a session peer; and
    receiving, in response to the probe request and using the OOB communication channel, remote mesh-pertinent state from the session peer,
wherein the initial mesh configuration is obtained further based on the remote mesh-pertinent state.

7. The method of claim 6, further comprising:
after deploying the at least portion of the initial mesh configuration:
    transmitting, using the OOB communication channel, the initial mesh configuration to the session peer,
wherein the session peer deploys at least another portion of the initial mesh configuration.

8. The method of claim 1, further comprising:
following a completion of the non-iterative process:
    performing, by the session initiator and until the collaboration session terminates, a second iterative process, comprising:
        aggregating changes to the local mesh-pertinent state;
        obtaining a mesh configuration update based at least on the changes to the local mesh-pertinent state; and
        deploying at least a portion of the mesh configuration update.

9. The method of claim 8, further comprising:
prior to obtaining the mesh configuration update:
    receiving, using an out-of-band (OOB) communication channel, changes to remote mesh-pertinent state from a session peer,
    wherein the mesh configuration update is obtained further based on the changes to the remote mesh-pertinent state; and
after deploying at least a portion of the mesh configuration update:
    transmitting, using the OOB communication channel, the mesh configuration update to the session peer,
    wherein the session peer deploys at least another portion of the mesh configuration update.

10. A non-transitory computer readable medium (CRM) comprising computer readable program code, which when executed by a computer processor, enables the computer processor to perform a method for collaboration session management, the method comprising:
    performing, by a session initiator and until a collaboration session terminates, an iterative process, comprising:
        collecting local context;
        transmitting the local context to a collaboration platform service;
        receiving, from the collaboration platform service, a just-in-time configuration policy selected at least based on the local context; and
        adjusting, based on the just-in-time configuration policy, at least a management of the collaboration session contributed by the session initiator,
    wherein the method further comprises:
        performing, by the session initiator and in parallel with the iterative process, a non-iterative process, comprising:
            aggregating local mesh-pertinent state;
            obtaining an initial mesh configuration based at least on the local mesh-pertinent state; and
            deploying at least a portion of the initial mesh configuration.

11. The non-transitory CRM of claim 10, wherein the method further comprises:
prior to transmitting the local context:
    detecting a local session-pertinent event triggered by a session initiator user associated with the session initiator,
wherein the local session-pertinent event is also transmitted to the collaboration platform service,
wherein the just-in-time configuration policy is selected further based on the local session-pertinent event.

12. The non-transitory CRM of claim 10, wherein the method further comprises:
prior to transmitting the local context:
    aggregating at least one selected from a group consisting of remote context and a remote session-pertinent event, from a session peer,
wherein the at least one selected from the group consisting of the remote context and the remote session-pertinent event, is also transmitted to the collaboration platform service,
wherein the just-in-time configuration policy is selected further based on the at least one selected from the group consisting of the remote context and the remote session-pertinent event.

13. The non-transitory CRM of claim 12, wherein the method further comprises:
- after adjusting at least the management of the collaboration session contributed by the session initiator:
  - sharing the just-in-time configuration policy with the session peer,
  - wherein the session peer, based on the just-in-time configuration policy, adjusts the management of the collaboration session contributed by the session peer.

14. The non-transitory CRM of claim 10, wherein obtaining the initial mesh configuration comprises one selected from a group consisting of evaluating, by the session initiator, the local mesh-pertinent state and delegating, by the session initiator, an evaluation of the local mesh-pertinent state to the collaboration platform service.

15. The non-transitory CRM of claim 10, wherein the method further comprises:
- prior to obtaining the initial mesh configuration:
  - transmitting, using an out-of-band (OOB) communication channel, a probe request to a session peer; and
  - receiving, in response to the probe request and using the OOB communication channel, remote mesh-pertinent state from the session peer,
- wherein the initial mesh configuration is obtained further based on the remote mesh-pertinent state.

16. The non-transitory CRM of claim 15, wherein the method further comprises:
- after deploying the at least portion of the initial mesh configuration:
  - transmitting, using the OOB communication channel, the initial mesh configuration to the session peer,
  - wherein the session peer deploys at least another portion of the initial mesh configuration.

17. The non-transitory CRM of claim 10, wherein the method further comprises:
- following a completion of the non-iterative process:
  - performing, by the session initiator and until the collaboration session terminates,
  - a second iterative process, comprising:
    - aggregating changes to the local mesh-pertinent state;
    - obtaining a mesh configuration update based at least on the changes to the local mesh-pertinent state; and
    - deploying at least a portion of the mesh configuration update.

18. The non-transitory CRM of claim 17, wherein the method further comprises:
- prior to obtaining the mesh configuration update:
  - receiving, using an out-of-band (OOB) communication channel, changes to remote mesh-pertinent state from a session peer,
  - wherein the mesh configuration update is obtained further based on the changes to the remote mesh-pertinent state; and
- after deploying at least a portion of the mesh configuration update:
  - transmitting, using the OOB communication channel, the mesh configuration update to the session peer,
  - wherein the session peer deploys at least another portion of the mesh configuration update.

\* \* \* \* \*